(12) United States Patent
Cai

(10) Patent No.: US 11,126,882 B2
(45) Date of Patent: Sep. 21, 2021

(54) METHOD AND DEVICE FOR LICENSE PLATE POSITIONING

(71) Applicant: Hangzhou Hikvision Digital Technology Co., Ltd., Zhejiang (CN)

(72) Inventor: Xiaohui Cai, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 14 days.

(21) Appl. No.: 16/473,787

(22) PCT Filed: Oct. 18, 2017

(86) PCT No.: PCT/CN2017/106661
§ 371 (c)(1),
(2) Date: Jun. 26, 2019

(87) PCT Pub. No.: WO2018/121006
PCT Pub. Date: Jul. 5, 2018

(65) Prior Publication Data
US 2020/0125876 A1 Apr. 23, 2020

(30) Foreign Application Priority Data
Dec. 30, 2016 (CN) .......................... 201611261487.4

(51) Int. Cl.
*G06K 9/32* (2006.01)
*G06K 9/46* (2006.01)
(Continued)

(52) U.S. Cl.
CPC ............. *G06K 9/325* (2013.01); *G06F 17/18* (2013.01); *G06K 9/46* (2013.01); *G06K 9/6256* (2013.01)

(58) Field of Classification Search
CPC ........ G06K 9/325; G06K 9/46; G06K 9/6256; G06K 9/4628; G06K 9/3258; G06K 2209/15; G06K 9/344; G06F 17/18
See application file for complete search history.

(56) References Cited

U.S. PATENT DOCUMENTS

2014/0270350 A1* 9/2014 Rodriguez-Serrano et al. ............
G06K 9/6217

FOREIGN PATENT DOCUMENTS

CN 103530600 A 1/2014
CN 103699905 A 4/2014
(Continued)

OTHER PUBLICATIONS

R. Yang, H. Yin and X. Chen, "License Plate Detection Based on Sparse Auto-Encoder," 2015 8th International Symposium on Computational Intelligence and Design (ISCID), Hangzhou, 2015, pp. 465-469, doi: 10.1109/ISCID.2015.151. (Year: 2015).*
(Continued)

*Primary Examiner* — Siamak Harandi
(74) *Attorney, Agent, or Firm* — Bret E. Field; Bozicevic, Field & Francis LLP

(57) ABSTRACT

Embodiments of the present application provide a license plate location method and apparatus. The method includes: acquiring a to-be-located license plate image; sending the to-be-located license plate image to a target network for license plate location; wherein, the target network comprises a feature extraction layer and a regression layer; extracting, by the feature extraction layer, a feature value of the to-be-located license plate image, and sending the feature value to the regression layer; acquiring a combination of a license plate frame area and a license plate character area, which is obtained by the regression layer based on the feature value; and determining a license plate area of the to-be-located license plate image based on a location area (Continued)

corresponding to the acquired combination. The target network is pre-trained by sample license plate images; the sample license plate images include positive sample license plate images, and the positive sample license plate images include combinations of license plate frame areas and license plate character areas. With the technical solutions according to embodiments of the present application, the accuracy of the license plate location can be improved.

14 Claims, 3 Drawing Sheets

(51) Int. Cl.
    *G06F 17/18*     (2006.01)
    *G06K 9/62*     (2006.01)
    *G06K 9/34*     (2006.01)

(56) References Cited

FOREIGN PATENT DOCUMENTS

| | | | |
|---|---|---|---|
| CN | 103870803 | A | 6/2014 |
| CN | 103902981 | A | 7/2014 |
| CN | 105373794 | A | 3/2016 |

OTHER PUBLICATIONS

R. Polishetty, M. Roopaei and P. Rad, "A Next-Generation Secure Cloud-Based Deep Learning License Plate Recognition for Smart Cities," 2016 15th IEEE International Conference on Machine Learning and Applications (ICMLA), Anaheim, CA, 2016, pp. 286-293, doi: 10.1109/ICMLA.2016.0054. (Year: 2016).*

Lu et al., Video Text Detection, Advances in Computer Vision and Pattern Recognition, Springer, Jan. 1, 2014, p. 170-180.

Li et al., Reading Car License Plates Using Deep Convolutional Neural Networks and LSTMs, Arxiv.org, Cornell University, Jan. 21, 2016, p. 1-17.

Polishetty et al., A Next-Generation Secure Cloud-Based Deep Learning License Plate Recognition for Smart Cities, 2016 15th IEEE International Conference on Machine Learning and Applications, Dec. 18, 2016, p. 286-294.

Jain et al., Deep Automatic License Plate Recognition System, ICVGIP '16: Proceedings of the Tenth Indian conference on Computer Vision, Graphics and Image Processing, Associate for Computing Machinery, Dec. 18, 2016, p. 1-8.

Gao et al., Research on Vehicle License Plate Localization in Complex Scene and Its Application, Chapter 3-4, p. 1674-0246, Oct. 15, 2016, English abstract enclosed.

Luo et al., Learning Corner Regression-based Fully Convolutional Neural Network for License Plate Localization in Complex Scene, Journal of Data Acquisition and Processing, vol. 31, No. 1, Jan. 2016, pp. 65-72, English abstract enclosed.

* cited by examiner

METHOD AND DEVICE FOR LICENSE PLATE POSITIONING

The present application claims the priority to a Chinese Patent Application No. 201611261487.4, filed with the China National Intellectual Property Administration, Dec. 30, 2016 and entitled "license plate location method and apparatus", which is incorporated into the present application by reference in its entirety.

TECHNICAL FIELD

The application relates to the field of intelligent transportation technology, and in particular to a license plate location method and apparatus.

BACKGROUND

A license plate is the "identity card" of a vehicle and is important information that distinguishes the vehicle from other vehicles. A license plate recognition technology has been widely used in scenes such as a traffic crossroad, a parking lot and an electronic police to obtain license plate information of vehicles in the scenes, and takes advantage of "intelligent traffic algorithm" in many aspects such as public security management.

In the related art, a license plate in a license plate image containing a license plate number is located usually, based on features such as different colors of a character and a background in the license plate, a large number of interface points between characters and the background in a license plate area. For example, for a license plate image shown in FIG. 1a, in locating a license plate area therein, a pixel value variation curve of each row of pixels in the license plate image may be obtained by taking a horizontal coordinate of a pixel as a horizontal axis and a pixel value of the pixel as a longitudinal axis, and a portion of the variation curve in which pixel values of pixels are regularly fluctuated is found, wherein, an area, corresponding to the portion, in the license plate image is the license plate area.

In general, the above license plate location method can be used to locate the license plate area in a common license plate image. However, for a license plate with a small number of characters, there are very few interface points between the characters and the background in the license plate area. For example, the number of continuous license plate characters in a license plate shown in FIG. 1b is only 1~2. In a pixel value variation curve of a license plate image for such a license plate, a portion of the variation curve in which pixel values are regularly fluctuated is not evident, so the license plate area cannot be located accurately by the above license plate location method.

SUMMARY

Embodiments of this application provide a license plate location method and apparatus for improving the accuracy of the license plate location. The following specific technical solutions are provided.

To achieve the above object, an embodiment of the present application provides a license plate location method including:

acquiring a to-be-located license plate image;

sending the to-be-located license plate image to a target network for license plate location; wherein, the target network includes a feature extraction layer and a regression layer; the target network is pre-trained by sample license plate images; the sample license plate images include positive sample license plate images; and the positive sample license plate images include combinations of license plate frame areas and license plate character areas;

extracting, by the feature extraction layer, a feature value of the to-be-located license plate image, and sending the feature value to the regression layer;

acquiring a combination of a license plate frame area and a license plate character area, which is obtained by the regression layer based on the feature value; and determining a license plate area of the to-be-located license plate image based on a location area corresponding to the acquired combination.

In one embodiment, the acquired combination includes multiple combinations, and determining a license plate area of the to-be-located license plate image based on a location area corresponding to the acquired combination includes:

determining a location area corresponding to a combination, in the acquired combinations, whose confidence degree is greater than a preset threshold as a target location area; and determining the license plate area of the to-be-located license plate image based on the target location area.

In one embodiment, the target location area includes multiple target location areas, and determining the license plate area of the to-be-located license plate image based on the target location area, includes:

determining relative positions between license plate frame areas and license plate character areas in the target location areas; and determining a target location area in which a relative position between a license plate frame area and a license plate character area is within a preset relative position range as the license plate area of the to-be-located license plate image.

In one embodiment, determining the license plate area of the to-be-located license plate image based on the target location area, includes:

determining a license plate character area in the target location area as the license plate area of the to-be-located license plate image.

In one embodiment, the method further includes:

recognizing a character in the determined license plate area to obtain a license plate number of the to-be-located license plate image.

To achieve the above object, an embodiment of the present application provides a license plate location apparatus including:

an image acquiring module, configured for acquiring a to-be-located license plate image;

an image sending module, configured for sending the to-be-located license plate image to a target network for license plate location; wherein, the target network includes a feature extraction layer and a regression layer; the target network is pre-trained by sample license plate images; the sample license plate images include positive sample license plate images; and the positive sample license plate images include combinations of license plate frame areas and license plate character areas;

a feature extraction module, configured for extracting, by the feature extraction layer, a feature value of the to-be-located license plate image, and sending the feature value to the regression layer;

a combination acquiring module, configured for acquiring a combination of a license plate frame area and a license plate character area, which is obtained by the regression layer based on the feature value; and an area determination module, configured for determining a license plate area of the to-be-located license plate image based on a location area corresponding to the acquired combination.

In one embodiment, the acquired combination includes multiple combinations, and the area determination module includes:

a target area determination submodule, configured for determining a location area corresponding to a combination, in the acquired combinations, whose confidence degree is greater than a preset threshold as a target location area; and a license plate area determination submodule, configured for determining the license plate area of the to-be-located license plate image based on the target location area.

In one embodiment, the target location area includes multiple target location areas, and the license plate area determination submodule is configured for:

determining relative positions between license plate frame areas and license plate character areas in the target location areas; and determining a target location area in which a relative position between a license plate frame area and a license plate character area is within a preset relative position range as the license plate area of the to-be-located license plate image.

In one embodiment, the license plate area determination submodule is configured for:

determining a license plate character area in the target location area as the license plate area of the to-be-located license plate image.

In one embodiment, the apparatus further includes:

a license plate recognition module, configured for recognizing a character in the determined license plate area to obtain a license plate number of the to-be-located license plate image.

To achieve the above object, an embodiment of the present application provides an electronic device, which is applicable for license plate location and includes:

a housing, a processor, a memory, a circuit board and a power circuit; wherein, the circuit board is arranged inside space surrounded by the housing; the processor and the memory are arranged on the circuit board; the power circuit is configured for supplying power to various circuits or components of the electronic device; the memory is configured for storing an executable program code; the processor is configured for, by reading the executable program code stored in the memory, executing a program corresponding to the executable program code to perform the operations of:

acquiring a to-be-located license plate image;

sending the to-be-located license plate image to a target network for license plate location; wherein, the target network includes a feature extraction layer and a regression layer; the target network is pre-trained by sample license plate images; the sample license plate images include positive sample license plate images; and the positive sample license plate images include combinations of license plate frame areas and license plate character areas;

extracting, by the feature extraction layer, a feature value of the to-be-located license plate image, and sending the feature value to the regression layer;

acquiring a combination of a license plate frame area and a license plate character area, which is obtained by the regression layer based on the feature value; and determining a license plate area of the to-be-located license plate image based on a location area corresponding to the acquired combination.

In one embodiment, the acquired combination includes multiple combinations, and the processor is caused to perform the operations of determining a location area corresponding to a combination, in the acquired combinations, whose confidence degree is greater than a preset threshold as a target location area; and determining the license plate area of the to-be-located license plate image based on the target location area.

In one embodiment, the target location area includes multiple target location areas, and the processor is caused to perform the operations of determining relative positions between license plate frame areas and license plate character areas in the target location areas; and determining a target location area in which a relative position between a license plate frame area and a license plate character area is within a preset relative position range as the license plate area of the to-be-located license plate image.

To achieve the above object, an embodiment of the present application provides an application program which, when executed, carries out the license plate location method provided by the embodiment of the present application. The license plate location method includes:

acquiring a to-be-located license plate image;

sending the to-be-located license plate image to a target network for license plate location; wherein, the target network includes a feature extraction layer and a regression layer; the target network is pre-trained by sample license plate images; the sample license plate images include positive sample license plate images; and the positive sample license plate images include combinations of license plate frame areas and license plate character areas;

extracting, by the feature extraction layer, a feature value of the to-be-located license plate image, and sending the feature value to the regression layer;

acquiring a combination of a license plate frame area and a license plate character area, which is obtained by the regression layer based on the feature value; and determining a license plate area of the to-be-located license plate image based on a location area corresponding to the acquired combination.

To achieve the above object, an embodiment of the present application provides an storage medium for storing an executable code, wherein, the executable code, when executed, carries out the license plate location method provided by the embodiment of the present application. The license plate location method includes:

acquiring a to-be-located license plate image;

sending the to-be-located license plate image to a target network for license plate location; wherein, the target network includes a feature extraction layer and a regression layer; the target network is pre-trained by sample license plate images; the sample license plate images include positive sample license plate images; and the positive sample license plate images include combinations of license plate frame areas and license plate character areas;

extracting, by the feature extraction layer, a feature value of the to-be-located license plate image, and sending the feature value to the regression layer;

acquiring a combination of a license plate frame area and a license plate character area, which is obtained by the regression layer based on the feature value; and determining a license plate area of the to-be-located license plate image based on a location area corresponding to the acquired combination.

In the technical solutions provided by the embodiments of the present application, after acquiring a to-be-located license plate image, the to-be-located license plate image is sent to a target network for license plate location; wherein the target network includes a feature extraction layer and a regression layer; then, the feature extraction layer extracts a feature value of the to-be-located license plate image, and sends the feature value to the regression layer; a combination of a license plate frame area and a license plate character area, which is obtained by the regression layer based on the feature value, is acquired; finally, a license plate area of the to-be-located license plate image is determined based on a location area corresponding to the acquired combination. The target network is pre-trained by sample license plate images. The sample license plate images include positive sample license plate images, and the positive sample license plate images include combinations of license plate frame areas and license plate character areas.

That is to say, in the embodiments of the present application, the license plate area of the to-be-located license plate image may be determined based on the location area corresponding to the combination of the license plate frame area and the license plate character area detected by the target network. There may be many non-license-plate-character areas in the to-be-located license plate image. The license plate area may be accurately located from multiple interference factors based on the combination relationship between the license plate frame areas and the license plate character areas, without needing the interface points between the characters and the background. Therefore, by applying the technical solutions provided by the embodiments of the present application, the accuracy of the license plate location can be improved.

BRIEF DESCRIPTION OF THE DRAWINGS

In order to more clearly illustrate the technical solutions in the embodiments of the present application or in the prior art, the accompanying drawings that need to be used in the embodiments or the prior art will be briefly described below. Obviously, the accompanying drawings in the following description are only some of the embodiments of the present application, and those skilled in the art may also obtain other accompanying drawings based on these accompanying drawings without any creative efforts.

DETAILED DESCRIPTION

The technical solutions in the embodiments of the present application will be described below in conjunction with the accompanying drawings in the embodiments of the present application. Obviously, the described embodiments are only some, and not all, of the embodiments of the present application. All other embodiments obtained based on the embodiments of the present application by those skilled in the art without any creative efforts fall into the scope of protection of the present application.

Embodiments of the present invention provide a license plate location method and apparatus, which are applicable to an electronic device. The electronic device may be a terminal device, a server, or the like. The terminal device may include a computer, a tablet computer, a smart phone, a driving recorder, and the like. The accuracy of the license plate location can be improved by using the technical solutions in embodiments of the present application. The present application will be described in detail below by specific embodiments.

Figure 2:
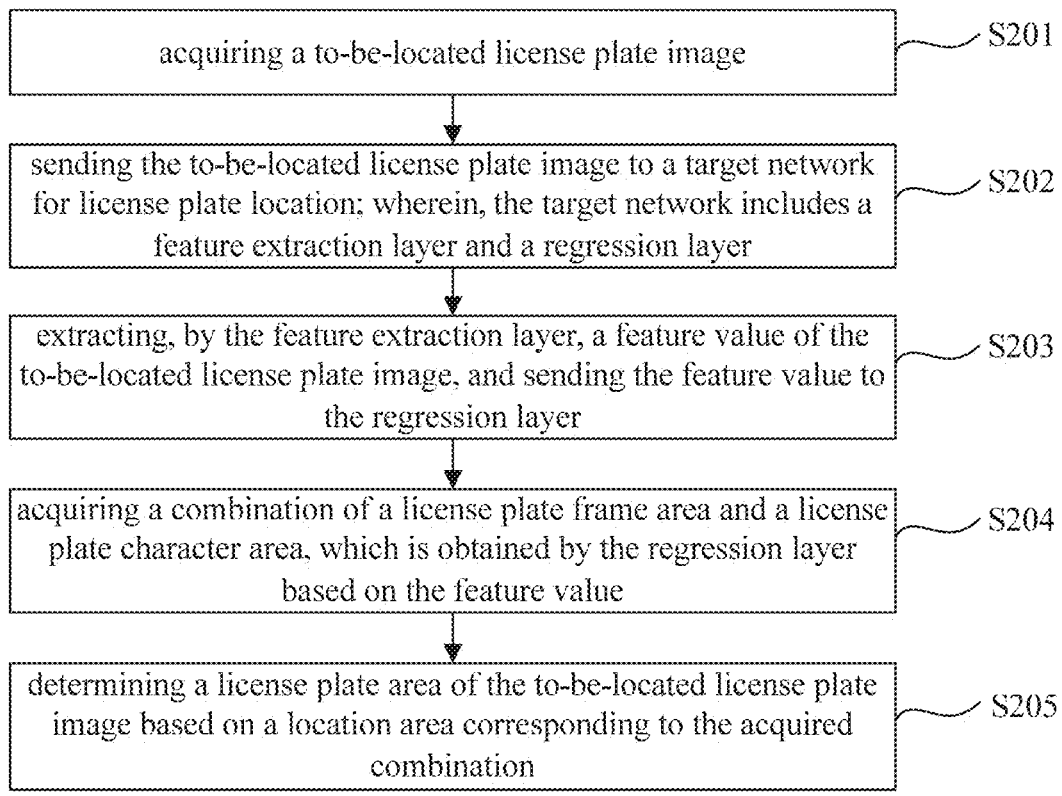
FIG. 2 shows a schematic flowchart of a license plate location method according to an embodiment of the present application.

FIG. 2 is a schematic flowchart of a license plate location method according to an embodiment of the present application. The method is applicable to an electronic device. The method specifically includes the following operations.

At operation S201, a to-be-located license plate image is acquired.

Specifically, the operation S201 is performed by an execution subject. It should be noted that an image capture device may be or may be not included inside the electronic device as the execution subject.

Specifically, when the image capture device is included inside the electronic device as the execution subject, after the image capture device obtains the to-be-located license plate image, the method may include: receiving the to-be-located license plate image captured by the image capture device.

When the image capture device is not included inside the electronic device as the execution subject, the electronic device may be connected to an external image capture device. After the image capture device obtains the to-be-located license plate image, the method may include: acquiring the to-be-located license plate image captured by the image capture device. Moreover, the acquired to-be-located license plate image may be captured by the image capture device in real time, or may not be captured in real time, but pre-captured and stored by the image capture device.

The above to-be-located license plate image may be considered as an image in which a license plate area is to be located. It can be understood that the license plate is usually installed or placed on the vehicle. Therefore, the above to-be-located license plate image may be considered as an image containing a vehicle in which a license plate area is to be located. Based on this, the above to-be-located license plate image may be an image containing a vehicle captured on the road, an image containing a vehicle captured in a parking lot, or the like. Certainly, the above to-be-located license plate image may be any one image containing a license plate area, and the manner of acquiring the to-be-located license plate image is not specifically limited in the present application.

At operation S202, the to-be-located license plate image is sent to a target network for license plate location.

Specifically, the operation S202 is performed by the execution subject. The target network includes a feature extraction layer and a regression layer. The feature extraction layer is configured for extracting a feature value of the to-be-located license plate image, and inputting the feature value into the regression layer. The regression layer is configured for acquiring the combination of a license plate frame area and a license plate character area based on the feature value. The target network is pre-trained by sample license plate images. The sample license plate images include positive sample license plate images, and the positive sample license plate images include combinations of license plate frame areas and license plate character areas.

The license plate frame area may be considered as an area enclosed by an outer frame of a license plate. The license plate character area may be considered as an area in which a license plate character is located in a license plate area. For example, there are four license plates in FIG. 3. An area numbered 1 in each license plate is a license plate frame area, and an area numbered 2 in each license plate is a license plate character area.

Specifically, sending the to-be-located license plate image to the target network for license plate location may include: sending the to-be-located license plate image to a feature extraction layer in the target network for license plate location.

In this embodiment, the target network may be a deep learning network such as a convolutional neural network. The target network may further include an input layer, which may be configured for receiving the to-be-located license plate image, pre-processing the to-be-located license plate image, and inputting the pre-processed to-be-located license plate image into the feature extraction layer. The pre-processing may specifically include at least one of: normalizing pixel values of pixels of an image; processing gray values of the pixels of the image based on a preset gray threshold to improve the brightness (too bright or too dark) of the image; modifying the size of the image; and so on.

When the target network includes the input layer, sending the to-be-located license plate image to the target network for license plate location may include: sending the to-be-located license plate image to the input layer in the target network for license plate location.

In a specific implementation, the target network may further include an output layer. When the regression layer obtains the combination of the license plate frame area and the license plate character area, the combination may be outputted through the output layer. In addition, the output layer may perform a certain processing, such as data encapsulation, on the combination and then output it.

In a specific implementation, the target network may include simultaneously the input layer, the feature extraction layer, the regression layer, the output layer, and the like. When the target network is a convolutional neural network, the target network may also be referred to as a cascaded convolutional neural network. A variation convolutional kernel and an activation function applied to the cascaded convolutional neural network may extract more complex character features, increase an inter-class difference between a character feature and a non-character feature, and reduce an intra-class difference between a character feature and a non-character feature, so that the license plate character area can be obtained more easily through the regression layer.

Figure 4:
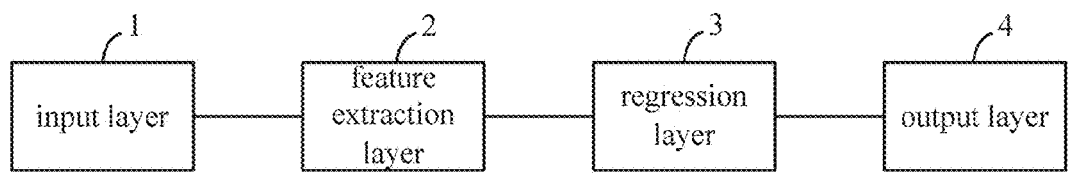
FIG. 4 shows a schematic structural diagram of a target network.

For example, FIG. 4 shows a schematic structural diagram of a target network. The target network includes: an input layer 1, a feature extraction layer 2, a regression layer 3 and an output layer 4. In locating the license plate, the to-be-located license plate image is input to the input layer 1, and a combination of the license plate frame area and the license plate character area for the to-be-located license plate image is obtained from the output layer 4, wherein, the combination is an output result of the output layer.

It should be noted that the output result may include a location area and a confidence degree corresponding to the combination of the license plate frame area and the license plate character area. Of course, the output result may include one or more location areas.

In this embodiment, the target network is pre-trained. In order to improve the robustness of the trained target network, the sample license plate images may also include negative sample license plate images when a model is trained. The negative sample license plate image may be considered as an image that does not contain a license plate area, that is, an image that does not contain a license plate frame area and a license plate character area.

Specifically, when the target network is trained, a large number of sample license plate images including positive sample license plate images and negative sample license plate images may be pre-obtained. A positive sample license plate image carries a marked combination of license plate frame area and license plate character area. The sample license plate images are sent to the feature extraction layer. After receiving the sample license plate images, the feature extraction layer obtains feature values of the sample license plate images, and sends the feature values and the sample license plate images to the regression layer. The regression layer receives information sent by the feature extraction layer, determines potential location areas in the sample license plate images based on the information, and then calculates coincidence degrees between the potential location areas and standard location areas. The standard location areas are location areas corresponding to the marked combinations of license plate frame areas and license plate character areas. Then, the relevant parameters of the regression layer are continuously adjusted based on the calculated result. When the coincidence degrees between the potential location areas and the standard location areas are higher than a set threshold, the training of target network is completed.

In a specific implementation, when the license plate area includes a main field area and a slave field area, the main field area may be selected as the license plate character area to be marked. A main field may be considered as a character which has a larger size and is distributed in the middle area of the license plate. A slave field may be considered as a character with identification function (recognizing the country or region) which has a size smaller than that in the main field character and is distributed at the edge of the license plate.

Figure 3:
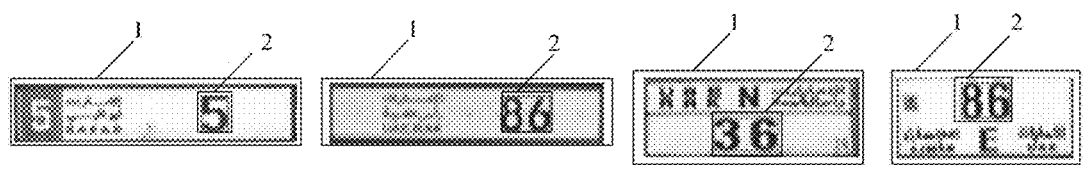
FIG. 3 shows an example of combinations of license plate frame areas and license plate character areas in several license plates.

For example, in the license plate shown in FIG. 3, the first license plate includes two characters "5". The left character "5" indicates the area to which the vehicle belongs, and is a slave field. The right character "5" indicates a license plate number, and is a main field. In the third license plate, the character "36" is a main field and the character "N" is the slave field.

At operation S203: the feature extraction layer extracts a feature value of the to-be-located license plate image, and sends the feature value to the regression layer.

Specifically, the operation S203 is performed by the feature extraction layer.

Specifically, acquiring the feature value of the to-be-located license plate image extracted by the feature extraction layer may include: acquiring a feature value(s), extracted by the feature extraction layer, for pixels in the to-be-located license plate image.

In a specific implementation, when the target network includes an input layer, the operation S203 may include the following implementations.

In a first implementation, the to-be-located license plate image pre-processed by the input layer is obtained and is sent to the feature extraction layer, and a feature value of the pre-processed to-be-located license plate image extracted by the feature extraction layer is acquired and is sent to the regression layer. In this implementation, the input layer pre-processes the to-be-located license plate image, and sends the pre-processed to-be-located license plate image to the feature extraction layer.

In a second implementation, the to-be-located license plate image sent by the input layer is acquired and is sent to the feature extraction layer, and a feature value of the to-be-located license plate image extracted by the feature extraction layer is acquired and is sent to the regression layer. In this implementation, the input layer does not pre-process the to-be-located license plate image, but sends directly the to-be-located license plate image to the feature extraction layer.

At operation S204, a combination of the license plate frame area and the license plate character area, which is obtained by the regression layer based on the feature value, is acquired.

Specifically, the operation S204 is performed by the execution subject.

It can be understood that when acquiring combinations of license plate frame areas and license plate character areas based on the feature value, the regression layer obtains a confidence degree corresponding to each of the combinations. Therefore, the acquired combinations may include a confidence degree of each combination.

In a specific implementation, when the target network includes an output layer, after the operation S204, the method may further include:

sending the acquired combination to the output layer such that the output layer outputs the acquired combination.

Of course, when the output layer outputs the acquired combination, the method may further include: processing the acquired combination based on a preset rule, and outputting the processed combination. The preset rule may include performing a sort based on a preset format, and so on.

At operation S205, a license plate area of the to-be-located license plate image is determined based on a location area corresponding to the acquired combination.

Specifically, the operation S205 is performed by the execution subject. The operation S205 may include: determining a location area corresponding to a combination whose confidence degree is greater than a preset threshold as a target location area, and determining the license plate area of the to-be-located license plate image based on the target location area.

As an example of determining the target location area, the acquired combinations include a combination 1, a combination 2, a combination 3 and a combination 4. Each combination is a combination of a license plate frame area and a license plate character area, and the confidence degrees of the four combinations are 320, 270, 950 and 890, respectively. If a preset threshold is 800, each of the confidence degrees of the combination 3 and the combination 4 is greater than the preset threshold. Thus, the location areas corresponding to the combination 3 and the combination 4 may be determined as the target location areas.

Further, determining the license plate area of the to-be-located license plate image based on the target location area may include the following implementations.

In a first implementation, relative positions between license plate frame areas and license plate character areas in the target location areas are determined, and a target location area in which a relative position between a license plate frame area and a license plate character area is within a preset relative position range is determined as the license plate area of the to-be-located license plate image.

In an implementation, the relative position between the license plate frame area and the license plate character area may be represented by a distance between boundaries corresponding to the two areas, or may be represented by a relative position between center points of the two areas in combination with a length ratio and a width ratio of the two areas.

It should be noted that the relative position range may be determined based on relative positions between license plate frame areas and license plate character areas in the pre-captured positive sample license plate images. It can be understood that the output result is filtered based on the preset relative position range, and non-license-plate areas may be effectively filtered out from the acquired combinations, improving the accuracy of the license plate location.

In a second implementation, the license plate character area in the target location area is determined as the license plate area of the to-be-located license plate image.

It can be understood that the license plate frame area has more image information than the license plate character area, and also has a large amount of interference information except the license plate characters. Therefore, in order to improve the accuracy of the license plate location, the license plate character area in the target location area may be directly determined as the license plate area of the to-be-located license plate image.

Of course, in this embodiment, the slave field of the license plate may be further determined for the license plate frame area in the target location area. Specifically, a category of license plate may be determined by a branch of the regression layer, that is, the category of license plate is determined based on overall texture information in the license plate frame, and then the position relationship between the slave field and the main field is determined by a preset category of license plate, so as to determine the slave field of the license plate from the license plate frame area.

It can be seen from the above content that, in the technical solution according to the embodiment, after acquiring the to-be-located license plate image, the to-be-located license plate image is sent to a target network for license plate location; wherein the target network includes a feature extraction layer and a regression layer; then, the feature extraction layer extracts a feature value of the to-be-located license plate image, and sends the feature value to the regression layer; a combination of a license plate frame area and a license plate character area, which is obtained by the regression layer based on the feature value, is acquired; finally, a license plate area of the to-be-located license plate image is determined based on a location area corresponding to the acquired combination. The target network is pre-trained by sample license plate images. The sample license plate images include positive sample license plate images. The positive sample license plate images include combinations of license plate frame areas and license plate character areas.

Figure 1A:
FIG. 1a is an example of a license plate image containing a license plate area.
Figure 1B:
FIG. 1b shows an example of a license plate with a small number of characters.
Figure 1C:
FIG. 1c shows an example of a license plate image in which a body of a vehicle contains non-license-plate characters.

That is to say, in the embodiment, the license plate area of the to-be-located license plate image is determined based on the location area corresponding to the combination of the license plate frame area and the license plate character area detected by the target network. There may be many non-license-plate-character areas or non-license-plate-frame areas in the to-be-located license plate image. For example, in the license plate image shown in FIG. 1c, on the body of the vehicle, there are some other interference factors such as other text portions and frame portions in addition to the license plate area. The license plate area can be accurately located from multiple interference factors based on the combination relationship of the license plate frame area and the license plate character area, without needing the interface points between the characters and the background. Therefore, with the solution of this embodiment, the accuracy of the license plate location can be improved.

In an embodiment shown in FIG. 2, after determining the license plate area of the to-be-located license plate image, the method may further include: recognizing a character in the determined license plate area to obtain a license plate number of the to-be-located license plate image.

Figure 5:
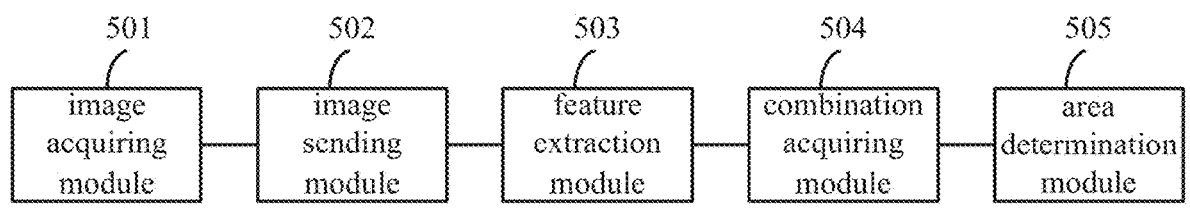
FIG. 5 shows a schematic structural diagram of a license plate location apparatus according to an embodiment of the present application.

FIG. 5 is a schematic structural diagram of a license plate location apparatus according to an embodiment of the present application. Corresponding to the embodiment of the method shown in FIG. 2, the apparatus is applicable to the electronic device and includes:

an image acquiring module 501, configured for acquiring a to-be-located license plate image;

an image sending module 502, configured for sending the to-be-located license plate image to a target network for license plate location; wherein, the target network includes a feature extraction layer and a regression layer; the target network is pre-trained by sample license plate images; the sample license plate images include positive sample license plate images; and the positive sample license plate images include combinations of license plate frame areas and license plate character areas;

a feature extraction module 503, configured for extracting, by the feature extraction layer, a feature value of the to-be-located license plate image, and sending the feature value to the regression layer;

a combination acquiring module 504, configured for acquiring a combination of a license plate frame area and a license plate character area, which is obtained by the regression layer based on the feature value; and an area determination module 505, configured for determining a license plate area of the to-be-located license plate image based on a location area corresponding to the acquired combination.

In a specific implementation based on the embodiment shown in FIG. 5, the acquired combination includes multiple combinations, and the area determining module 505 may include:

a target area determination submodule (not shown in the figure), configured for determining a location area corresponding to a combination, in the acquired combinations, whose confidence degree is greater than a preset threshold as a target location area; and a license plate area determination submodule (not shown in the figure), configured for determining the license plate area of the to-be-located license plate image based on the target location area.

In a specific implementation based on the embodiment shown in FIG. 5, the target location area includes multiple target location areas, and the license plate area determination submodule is configured for:

determining relative positions between license plate frame areas and license plate character areas in the target location areas; and determining a target location area in which a relative position between a license plate frame area and a license plate character area is within a preset relative position range as the license plate area of the to-be-located license plate image.

In a specific implementation based on the embodiment shown in FIG. 5, the license plate area determination submodule is specifically configured for:

determining a license plate character area in the target location area as the license plate area of the to-be-located license plate image.

In a specific implementation based on the embodiment shown in FIG. 5, the apparatus may further include: a license plate recognition module (not shown in the figure), configured for recognizing a character in the determined license plate area to obtain a license plate number of the to-be-located license plate image.

Since the above embodiment of the apparatus is obtained based on the embodiment of the method, and brings the same technical effect as the method, the technical effect of the embodiment of the apparatus is not described herein again.

The embodiment of the apparatus is described briefly, since it is substantially similar to the embodiment of the method, and the related contents can refer to the description of the embodiment of the method.

An embodiment of the present application provides an electronic device, which is applicable for license plate location and including:

a housing, a processor, a memory, a circuit board and a power circuit; wherein, the circuit board is arranged inside a space surrounded by the housing; the processor and the memory are arranged on the circuit board; the power circuit is configured for supplying power to various circuits or components of the electronic device; the memory is configured for storing an executable program code; the processor is configured for, by reading the executable program code stored in the memory, executing a program corresponding to the executable program code to perform the operations of:

acquiring a to-be-located license plate image;

sending the to-be-located license plate image to a target network for license plate location; wherein, the target network includes a feature extraction layer and a regression layer; the target network is pre-trained by sample license plate images; the sample license plate images include positive sample license plate images; and the positive sample license plate images include combinations of license plate frame areas and license plate character areas;

extracting, by the feature extraction layer, a feature value of the to-be-located license plate image, and sending the feature value to the regression layer;

acquiring a combination of a license plate frame area and a license plate character area, which is obtained by the regression layer based on the feature value; and determining a license plate area of the to-be-located license plate image based on a location area corresponding to the acquired combination.

The electronic device may exist in various forms, including but not limited to:

(1) mobile communication devices: this type of device has a mobile communication function, and mainly aims at providing voice and data communication. Such a device includes: a smart phone (e.g., iPhone), a multimedia phone, a functional phone, a low-end phone, and the like.

(2) ultra-mobile personal computer devices: this type of device belongs to the category of personal computers, has computing and processing functions, and generally also has mobile network properties. Such a device includes: PDA, MID, UMPC (e.g., iPad) and the like.

(3) portable entertainment devices: this type of device may display and play multimedia contents. Such a device includes: an audio and video player (e.g., iPod), a Portable Game Console, an e-book, and a smart toy and a portable onboard navigation device.

(4) servers which are devices that provide computing services, and are composed of a processor, a hard disk, a RAM, a system bus and the like. The architecture of a server is similar to that of a general computer, but the server has relatively high requirements in terms of processing capacity, stability, reliability, security, expandability, manageability and the like, due to highly reliable services.

(5) other electronic apparatuses that have a data interaction function.

It can be seen that, in this embodiment, the license plate area of the to-be-located license plate image may be determined based on the location area corresponding to the combination of the license plate frame area and the license plate character area detected by the target network. There may be many non-license-plate-character areas in the to-be-located license plate image. The license plate area may be accurately located from multiple interference factors based on the combination relationship between the license plate frame areas and the license plate character areas, without needing the interface points between the characters and the background. Therefore, with the technical solution provided by the embodiment of the present application, the accuracy of the license plate location can be improved.

In a specific implementation based on this embodiment, the acquired combination includes multiple combinations, and the processor is caused to perform the operations of determining a location area corresponding to a combination, in the acquired combinations, whose confidence degree is greater than a preset threshold as a target location area; and determining the license plate area of the to-be-located license plate image based on the target location area.

In a specific implementation based on this embodiment, the target location area includes multiple target location areas, and the processor is caused to perform the operations of determining relative positions between license plate frame areas and license plate character areas in the target location areas; and determining a target location area in which a relative position between a license plate frame area and a license plate character area is within a preset relative position range as the license plate area of the to-be-located license plate image.

An embodiment of the present application provides an application program which, when executed, carries out the license plate location method provided by the embodiment of the present application. The license plate location method includes:

acquiring a to-be-located license plate image;

sending the to-be-located license plate image to a target network for license plate location; wherein, the target network includes a feature extraction layer and a regression layer; the target network is pre-trained by sample license plate images; the sample license plate images include positive sample license plate images; and the positive sample license plate images include combinations of license plate frame areas and license plate character areas;

extracting, by the feature extraction layer, a feature value of the to-be-located license plate image, and sending the feature value to the regression layer;

acquiring a combination of a license plate frame area and a license plate character area, which is obtained by the regression layer based on the feature value; and determining a license plate area of the to-be-located license plate image based on a location area corresponding to the acquired combination.

It can be seen that, in this embodiment, the license plate area of the to-be-located license plate image may be determined based on the location area corresponding to the combination of the license plate frame area and the license plate character area detected by the target network. There may be many non-license-plate-character areas in the to-be-located license plate image. The license plate area may be accurately located from multiple interference factors based on the combination relationship between the license plate frame areas and the license plate character areas, without needing the interface points between the characters and the background. Therefore, with the technical solution provided by the embodiment of the present application, the accuracy of the license plate location can be improved.

The embodiment of the present application provides a storage medium for storing an executable code, wherein, the executable code, when executed, carries out the license plate location method provided by the embodiment of the present application. The license plate location method includes:

acquiring a to-be-located license plate image;

sending the to-be-located license plate image to a target network for license plate location; wherein, the target network includes a feature extraction layer and a regression layer; the target network is pre-trained by sample license plate images; the sample license plate images include positive sample license plate images; and the positive sample license plate images include combinations of license plate frame areas and license plate character areas;

extracting, by the feature extraction layer, a feature value of the to-be-located license plate image, and sending the feature value to the regression layer;

acquiring a combination of a license plate frame area and a license plate character area, which is obtained by the regression layer based on the feature value; and determining a license plate area of the to-be-located license plate image based on a location area corresponding to the acquired combination.

It can be seen that, in this embodiment, the license plate area of the to-be-located license plate image may be determined based on the location area corresponding to the combination of the license plate frame area and the license plate character area detected by the target network. There may be many non-license-plate-character areas in the to-be-located license plate image. The license plate area may be accurately located from multiple interference factors based on the combination relationship between the license plate frame areas and the license plate character areas, without needing the interface points between the characters and the background. Therefore, with the technical solution provided by the embodiment of the present application, the accuracy of the license plate location can be improved.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that are not specifically listed or the elements intrinsic to these processes, methods, articles, or devices. Without further limitations, elements limited by the wording "include(s) a/an . . . " or "comprise(s) a/an . . . " do not exclude additional identical elements in the processes, methods, articles, or devices, including the listed elements.

It can be understood by those skills in the art that all or a part of operations in the above implementations can be accomplished by instructing related hardware through programs, which may be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A license plate location method, comprising:
   acquiring a to-be-located license plate image, which is an image containing a license plate area;
   sending the to-be-located license plate image to a target network for license plate location; wherein, the target network comprises a feature extraction layer and a regression layer; the target network is pre-trained by sample license plate images; the sample license plate images comprise positive sample license plate images; and the positive sample license plate images comprise combinations of license plate frame areas and license plate character areas;
   extracting, by the feature extraction layer, a feature value of the to-be-located license plate image, and sending the feature value to the regression layer;
   acquiring a combination of a license plate frame area and a license plate character area, which is obtained by the regression layer based on the feature value, wherein the license plate frame area is an area enclosed by an outer frame of a license plate, and the license plate character area is an area in which a license plate character is located; and
   determining a license plate area of the to-be-located license plate image based on a location area corresponding to the acquired combination.

2. The method according to claim 1, wherein, the acquired combination comprises multiple combinations, and determining a license plate area of the to-be-located license plate image based on a location area corresponding to the acquired combination comprises:
   determining a location area corresponding to a combination, in the acquired combinations, whose confidence degree is greater than a preset threshold as a target location area; and
   determining the license plate area of the to-be-located license plate image based on the target location area.

3. The method according to claim 2, wherein, the target location area comprises multiple target location areas, and determining the license plate area of the to-be-located license plate image based on the target location area, comprises:
   determining relative positions between license plate frame areas and license plate character areas in the target location areas; and
   determining a target location area in which a relative position between a license plate frame area and a license plate character area is within a preset relative position range as the license plate area of the to-be-located license plate image.

4. The method according to claim 2, wherein, determining the license plate area of the to-be-located license plate image based on the target location area, comprises:
   determining a license plate character area in the target location area as the license plate area of the to-be-located license plate image.

5. The method according to claim 1, further comprising:
   recognizing a character in the determined license plate area to obtain a license plate number of the to-be-located license plate image.

6. A license plate location system, comprising:
   a camera, configured for acquiring a to-be-located license plate image, which is an image containing a license plate area; and
   a server, configured for:
   receiving the to-be-located license plate image, and sending the to-be-located license plate image to a target network for license plate location; wherein, the target network comprises a feature extraction layer and a regression layer; the target network is pre-trained by sample license plate images; the sample license plate images comprise positive sample license plate images; and the positive sample license plate images comprise combinations of license plate frame areas and license plate character areas;
   extracting, by the feature extraction layer, a feature value of the to-be-located license plate image, and sending the feature value to the regression layer;
   acquiring a combination of a license plate frame area and a license plate character area, which is obtained by the regression layer based on the feature value, wherein the license plate frame area is an area enclosed by an outer frame of a license plate, and the license plate character area is an area in which a license plate character is located; and
   determining a license plate area of the to-be-located license plate image based on a location area corresponding to the acquired combination.

7. The system according to claim 6, wherein, the acquired combination comprises multiple combinations, and the server is further configured for:
   determining a location area corresponding to a combination, in the acquired combinations, whose confidence degree is greater than a preset threshold as a target location area; and
   determining the license plate area of the to-be-located license plate image based on the target location area.

8. The system according to claim 7, wherein, the target location area comprises multiple target location areas, and the server is further configured for:
   determining relative positions between license plate frame areas and license plate character areas in the target location areas; and
   determining a target location area in which a relative position between a license plate frame area and a license plate character area is within a preset relative position range as the license plate area of the to-be-located license plate image.

9. The system according to claim 7, wherein, the server is further configured for:
   determining a license plate character area in the target location area as the license plate area of the to-be-located license plate image.

10. The system according to claim 6, wherein the server is further configured for:
    recognizing a character in the determined license plate area to obtain a license plate number of the to-be-located license plate image.

11. An electronic device, which is applicable for license plate location and comprises:
    a housing, a processor, a memory, a circuit board and a power circuit; wherein, the circuit board is arranged inside space surrounded by the housing; the processor and the memory are arranged on the circuit board; the power circuit is configured for supplying power to various circuits or components of the electronic device; the memory is configured for storing an executable program code; the processor is configured for, by reading the executable program code stored in the memory, executing a program corresponding to the executable program code to perform the operations of:

acquiring a to-be-located license plate image, which is an image containing a license plate area;

sending the to-be-located license plate image to a target network for license plate location; wherein, the target network comprises a feature extraction layer and a regression layer; the target network is pre-trained by sample license plate images; the sample license plate images comprise positive sample license plate images; and the positive sample license plate images comprise combinations of license plate frame areas and license plate character areas;

extracting, by the feature extraction layer, a feature value of the to-be-located license plate image, and sending the feature value to the regression layer;

acquiring a combination of a license plate frame area and a license plate character area, which is obtained by the regression layer based on the feature value, wherein the license plate frame area is an area enclosed by an outer frame of a license plate, and the license plate character area is an area in which a license plate character is located; and determining a license plate area of the to-be-located license plate image based on a location area corresponding to the acquired combination.

12. The electronic device according to claim 11, wherein, the acquired combination comprises multiple combinations, and the processor is caused to perform the operations of determining a location area corresponding to a combination, in the acquired combinations, whose confidence degree is greater than a preset threshold as a target location area; and determining the license plate area of the to-be-located license plate image based on the target location area.

13. The electronic device according to claim 12, wherein, the target location area comprises multiple target location areas, and the processor is caused to perform the operations of determining relative positions between license plate frame areas and license plate character areas in the target location areas; and determining a target location area in which a relative position between a license plate frame area and a license plate character area is within a preset relative position range as the license plate area of the to-be-located license plate image.

14. A non-transitory storage medium for storing an executable code, wherein, the executable code, when executed, carries out the license plate location method of claim 1.

* * * * *